United States Patent
Zang et al.

(10) Patent No.: US 10,458,469 B2
(45) Date of Patent: Oct. 29, 2019

(54) BEARING UNIT

(71) Applicant: Aktiebolaget SKF, Gothenburg (SE)

(72) Inventors: Christian Zang, Nordheim (DE); Werner Horn, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/922,161

(22) Filed: Mar. 15, 2018

(65) Prior Publication Data

US 2019/0085898 A1      Mar. 21, 2019

(30) Foreign Application Priority Data

Mar. 27, 2017    (DE) .................. 10 2017 205 157

(51) Int. Cl.
| | |
|---|---|
| *F16C 33/58* | (2006.01) |
| *F16C 19/38* | (2006.01) |
| *F16C 33/60* | (2006.01) |
| *F16C 25/06* | (2006.01) |

(Continued)

(52) U.S. Cl.
CPC .......... *F16C 19/385* (2013.01); *F16C 19/386* (2013.01); *F16C 25/06* (2013.01); *F16C 33/585* (2013.01); *F16C 33/60* (2013.01); *F03D 80/70* (2016.05); *F05B 2240/50* (2013.01); *F16C 35/063* (2013.01); *F16C 2229/00* (2013.01); *F16C 2300/14* (2013.01); *F16C 2360/31* (2013.01); *Y02E 10/722* (2013.01); *Y02P 70/523* (2015.11)

(58) Field of Classification Search
CPC .. F16C 19/184; F16C 19/1938; F16C 19/385; F16C 25/06; F16C 33/60; F16C 2229/00; F16C 2360/31
See application file for complete search history.

(56) References Cited

U.S. PATENT DOCUMENTS

| | | | | |
|---|---|---|---|---|
| 8,858,382 B2 * | 10/2014 | Smith | ................. | F16H 57/0471 |
| | | | | 475/160 |
| 9,103,369 B2 * | 8/2015 | Krug | ..................... | F16C 19/364 |

(Continued)

FOREIGN PATENT DOCUMENTS

| | | | | |
|---|---|---|---|---|
| DE | 102011085258 A1 * | 5/2013 | ............ | F16C 19/386 |
| EP | 2072858 A1 * | 6/2009 | ............ | F16C 19/386 |
| WO | WO-2012097962 A2 * | 7/2012 | ............. | F16C 25/08 |

*Primary Examiner* — Phillip A Johnson

(74) *Attorney, Agent, or Firm* — Bryan Peckjian; SKF USA Inc. Patent Dept.

(57) ABSTRACT

A large size bearing unit provides a rolling bearing having a first ring element and a second ring element and a plurality of rolling elements interposed radially in-between the first and the second ring elements. The first and the second ring elements rotate relative each other in relation to a rotational axle. The first ring element provides at least two separate ring elements located adjacently in a row along the rotational axle. At least one ring-formed support element is at least partly embedding the at least two separate ring elements and includes a seat surface onto which the at least two separate ring elements are located. The at least one ring-formed support element has two axially opposite surfaces extending radially from the seat surface to partly enclose the at least two separate ring elements. At least one of the axially opposite side surfaces is located on a separate ring-formed element.

13 Claims, 8 Drawing Sheets

(51) Int. Cl.
*F03D 80/70* (2016.01)
*F16C 35/063* (2006.01)

(56) References Cited

U.S. PATENT DOCUMENTS

2011/0150383 A1* 6/2011 Yoshida .................. F16C 23/08
                                                            384/590
2011/0162174 A1* 7/2011 Liesegang ............. F16C 35/063
                                                             24/457

* cited by examiner

BEARING UNIT

CROSS-REFERENCE

This application claims priority to German patent application no. 102017205157.4 filed on Mar. 27, 2017, the contents of which are fully incorporated herein by reference.

TECHNOLOGICAL FIELD

According to a first aspect, the present invention relates to a large size bearing unit comprising a rolling bearing. According to a second aspect, the present invention relates to a wind turbine main shaft arrangement comprising a large size bearing unit according to the first aspect of the invention. According to a third aspect, the invention regards a method to assemble a large size bearing unit according to the first aspect of the invention.

BACKGROUND

Rolling bearings are well known mechanical components which are used to rotatably support for example rotating shafts and the like. There are numerous types of rolling bearings available on the market, such as ball bearings and roller bearings of different designs. These bearing types can generally be used in many different applications, and some are more useful and designed for certain circumstances. Some rolling bearings are mainly designed to accommodate radial loads, some are mainly designed to accommodate axial loads and further some bearing types are designed to accommodate a combination of radial and axial loads. In addition, there are also bearing designs which are made to accommodate radial and axial loads, but also moment loads (e.g. yaw or bending moment loads). An example of a bearing that can accommodate radial, axial and moment loads is a double row tapered roller bearing that may present a split inner ring, a single outer ring and two rows of tapered roller elements interposed in-between the rings. Such a bearing may be designed with a so called O- or X-configuration, also known as a face-to-face or back-to-back configuration.

For rotating applications which are large in size and where there are high loads present, there is most likely a need for a bearing of a larger size, for example a bearing providing an outer diameter being larger than 0.5 meters. During operation of the bearing, when it is exposed of different types of loads (radial, axial and/or moment loads), the running performance may be affected negatively leading to a reduced service life of the bearing. One example of a demanding application which is large in size is a wind turbine. A wind turbine can be designed with different bearing configurations and arrangements. In one example, the wind turbine main shaft is supported by only one bearing, such as the double row tapered roller bearing which can accommodate axial, radial and moment loads, as mentioned above. Other examples of industries that uses rotating machinery which are large in size are mining, mineral processing, process industry, construction machines, marine, ocean energy etc. For applications comprising rolling bearings, there is most often a big advantage if the rolling bearings provide a long service life. In order to assure a smooth operation of rolling bearings in such demanding applications, it may be important to set a correct bearing clearance or preload.

SUMMARY

In view of the above, an object of the present invention is to provide an improved large size bearing unit design that will lead to a longer bearing service life and which will assure that the required bearing clearance or preload is provided. In addition, an object of the present invention is to provide an improved bearing unit design that alleviates at least one of the drawbacks of the prior art bearing designs.

The objects are achieved by the subject matter as specified in the independent claims. Preferred embodiments of the invention can be found in the dependent claims and in the accompanying description.

According to the first aspect thereof, the object is achieved by a large size bearing unit which comprises a rolling bearing providing a first ring element and a second ring element and a plurality of rolling elements interposed radially in-between the first and the second ring elements such that the first and the second ring elements can rotate relative each other in relation to a rotational axle. The first ring element provides at least two separate ring elements which are located adjacently in a row along the rotational axle. Furthermore, at least one ring-formed support element is at least partly embedding the at least two separate ring elements and provides a seat surface onto which the at least two separate ring elements are located, wherein the at least one ring-formed support element further provides two axially opposite surfaces extending radially from the seat surface to thereby partly enclose the at least two separate ring elements. At least one of the axially opposite side surfaces is located on a separate ring-formed element of the at least one ring-formed support element, and wherein the side surfaces are in pressurized contact with corresponding axially outer side surfaces of the at least two separate ring elements in order to press them together to thereby set a specific preload or clearance to the rolling bearing.

With the proposed design, a bearing unit will be provided which will present a specific and predetermined bearing preload or clearance that will be essentially maintained also after the bearing unit has been mounted in its intended application. In prior art designs, the bearing preload or clearance has been set during the mounting procedure of the rolling bearing in its application. Especially, a moment bearing, such as a double-row tapered roller bearing, needs to have a specific bearing preload or clearance adapted for its specific application in order to achieve a smooth operation. In previous solutions, the customer mounts the bearing on a shaft and thereby the clearance/preload will be significantly changed by the interference fits between the surrounding parts and by the number of tolerance fields. Partly these effects are so strong that a very high manufacturing precision is needed to achieve the defined clearance/preload values. With the proposed design, this cumbersome process can be avoided since the bearing preload/clearance can be set already when the bearing unit is manufactured and assembled.

Other benefits of the present invention are:

1) Simpler and more cost efficient bearing manufacturing because the effort for machining (e.g. grinding) the bearing components such that they are adapted for the specific application can be avoided.

2) More flexibility for the application of bearings of the same size (scaling effect). The objective criterion is not anymore the bearing clearance defined by the customer machine, but the axial preload of the unit calculated according to the operating conditions.

3) Tolerances at the rings, shafts and housings can be relaxed and increased.

4) Reduced or no need for time-consuming tooling like drilling on the bearing, because mounting bores can now be put on the support element, and not on the rolling bearing.

5) Optimized shaft geometry in order to get an optimal ratio between weight and stiffness.

6) Such a unit may comprise a housing part as well, which gives the second ring the needed support. This may save the expensive bearing steel for thick outer or inner rings.

7) The separate ring-formed element (e.g. clamping ring) of the ring-formed support element can be designed much stiffer because the axial gap between the rings may not be closed anymore. Thereby a better support of the rings against misalignment is reached. Deformations by preloading occur only at the raceway contacts between rolling elements and rings. This reduces the system deformations by external loads.

8) Lower and more uniform distributed deformations within the unit will affect the sealing performance (if seals are present) and the airgap distribution in a positive manner as well.

9) The lower deformation of the stiffer clamping ring leads to lower bolt loads of the clamping ring screw connection.

10) The bearing preload can be adjusted after mounting within the machine if needed.

11) The bearing rings can be designed simpler and more cost efficient because several details that may be needed for the bearing operation can be provided at the surrounding elements (sensor holes, lubrication grooves, handling devices etc.). This minimizes the stress concentration effects influencing the strength of the rings.

12) The bearing unit preload deviation can be significantly reduced compared with the prior art solutions, which leads to a lower deviation of the bearing life and the friction moment.

13) Lower preload deviation could make it possible for larger external loads. Today the maximum possible preload (deviation) determines the maximum bearable external load.

14) Relative ring-slipping of the at least two ring elements of the first ring of the rolling bearing may be avoided.

15) Provides a simple and well defined interface to the customer parts.

In this document, the expressions axial and radial are sometimes used to define the different features of the different aspects of the invention. Unless stated otherwise, an axial direction means a direction extending along the rotational axle of the bearing unit. Consequently, a radial direction means a direction which is perpendicular to the axial direction.

According to an embodiment of the present invention, a large size bearing unit is a bearing unit that provides an outer diameter which is larger than 0.5 meters. According to another embodiment, the large size bearing unit is a large size wind turbine bearing unit.

According to an embodiment of the present invention, the first ring element provides two separate ring elements.

According to an embodiment of the present invention, the rolling elements of the rolling bearing are arranged in two rolling rows which are axially displaced in relation to the rotational axle. In a further embodiment, each respective rolling row is located on one respective separate ring element of the first ring element.

According to an embodiment of the present invention, the separate ring-formed element of the at least one ring-formed support element is made by at least two separate ring elements.

According to an embodiment of the present invention, the separate ring-formed element of the at least one ring-formed support element is fixedly connected to the ring-formed support element by a connection means, such as a screw connection.

According to an embodiment of the present invention, the separate ring-formed element of the at least one ring-formed support element provides an L-shape as seen in an axial cross section which coincides with the rotational axle.

According to an embodiment of the present invention, the at least one ring-formed support element provides in inner open geometry, wherein the inner open geometry provides at least one structural elongated element which is arranged for accommodating a load in the support element. It has namely been realized that such a design may lead to a more robust and stiff bearing unit design, which also will be light in weight compared to a bearing unit providing for example a solid supporting element without any open inner geometry. In addition, when the bearing unit is mounted into its application, deformations of surrounding mechanical elements (such as a hub of a wind turbine and/or a bearing housing) may not be transferred to the rolling bearing. Instead the support element of the bearing unit will accommodate such deformations (by the structural elongated element) and thereby the rolling bearing can continue to mainly operate in its nominal geometry (e.g. low ovalization of the bearing rings, reduced or no misalignment and/or twisting of the bearing rings). In addition, the rolling elements can rotate with undisturbed kinematics. This will lead to reduced wear of the bearing components and consequently a longer service life. According to an embodiment of the present invention, the at least one ring-formed support element provides a plurality of structural elongated elements in the inner open geometry, wherein the structural elongated elements are arranged as a truss.

According to an embodiment of the present invention, the bearing unit further comprises an additional ring-formed support element which is at least partly embedding the second ring element of the rolling bearing. In an embodiment, also the additional ring-formed support element provides an inner open geometry, wherein the inner open geometry provides at least one structural elongated element which is arranged for accommodating a load in the support element. The outer or inner ring that is embedded by the additional support element of such a unit may be designed with interference fit to the additional element. This may not influence the preload which can be applied in a subsequent step. In an embodiment, the additional ring-formed support element is a bearing housing.

According to an embodiment of the present invention, the rolling bearing is any one of a:
  moment bearing,
  a tapered roller bearing,
  a cylindrical roller bearing, or
  an angular contact double-row roller bearing providing curved-shaped raceways.

In an embodiment, a moment bearing is a bearing that can accommodate bending moments.

According to an embodiment of the present invention, the at least one ring-formed support element provides connection means for connection the large size bearing unit to an application. In an embodiment, the connection means are configured as a screw connection in which the at least one ring-formed element provides bores in which screws can be inserted and hence connected to the application, such as a wind turbine. In a further embodiment, the bores are essentially extending in an axial direction.

According to the second aspect thereof, the object is achieved by a wind turbine main shaft arrangement comprising a large size bearing unit, according any of the embodiments of the first aspect of the invention, for rotatably supporting a hub onto which a number of propeller blades are connected. It has namely been realized that it would be especially advantageous to provide a wind turbine main shaft arrangement with a bearing unit of the design as proposed herein. In wind turbines, it is very important that the bearing preload/clearance is set correctly in order to achieve a good performance and a long bearing service life. Other advantages and benefits are essentially analogous to the ones already presented in relation to the first aspect of the invention. It shall also be noted that all embodiments of the first aspect of the invention are applicable to all of the embodiments of the second aspect of the invention and vice versa.

According to the third aspect thereof, the object is achieved by a method to assemble a large size bearing unit according to the first aspect of the invention. The method comprises the following steps:

a) mount the rolling bearing onto the seat surface of the ring-formed support element, b) press the at least two separate ring elements of the first ring element against one of the axially opposite side surfaces to obtain a specific axial pressure, c) subsequently measure an axial distance $\Delta 1$ of the ring-formed support element where the at least one separate ring-formed element of the ring-formed support element is meant to be positioned, d) provide the separate ring-formed element with a specific axial distance $\Delta 2$ based on the measured distance $\Delta 1$ such that the specific axial pressure can be obtained after the separate ring-formed element has been mounted onto the ring-formed support element, e) mount the separate ring-formed element onto the ring-formed support element.

Advantages and benefits of the method are essentially analogous to the advantages and benefits as already explained in relation to the first and the second aspect of the invention. The method provides an easy and cost-efficient procedure of assembling a large size bearing unit with a specific bearing preload or clearance. It shall also be noted that the embodiments of the third aspect of the invention are applicable to the embodiments of the first and second aspect of the invention and vice versa, unless expressed otherwise.

According to an embodiment of the present invention, step c) of the method comprises:

c) subsequently measure an axial distance $\Delta 1$ of an axially extending and radially peripheral surface of the ring-formed support element where the at least one separate ring-formed element of the ring-formed support element is meant to be positioned.

According to an embodiment of the present invention, step a) of the method comprises the additional step of heating the rolling bearing such that its inner peripheral diameter increases before the bearing is mounted onto the seat surface. In an embodiment, the rolling bearing is cooled down after it has been mounted onto the seat surface.

According to an embodiment of the present invention, the at least two ring elements of the first ring element are pressed onto the seat surface by the use of a fluid pressure, such as oil pressure.

BRIEF DESCRIPTION OF THE DRAWINGS

Exemplifying and preferred embodiments of the present invention will now be described more in detail, with reference to the accompanying drawings, wherein.

Figure 1:
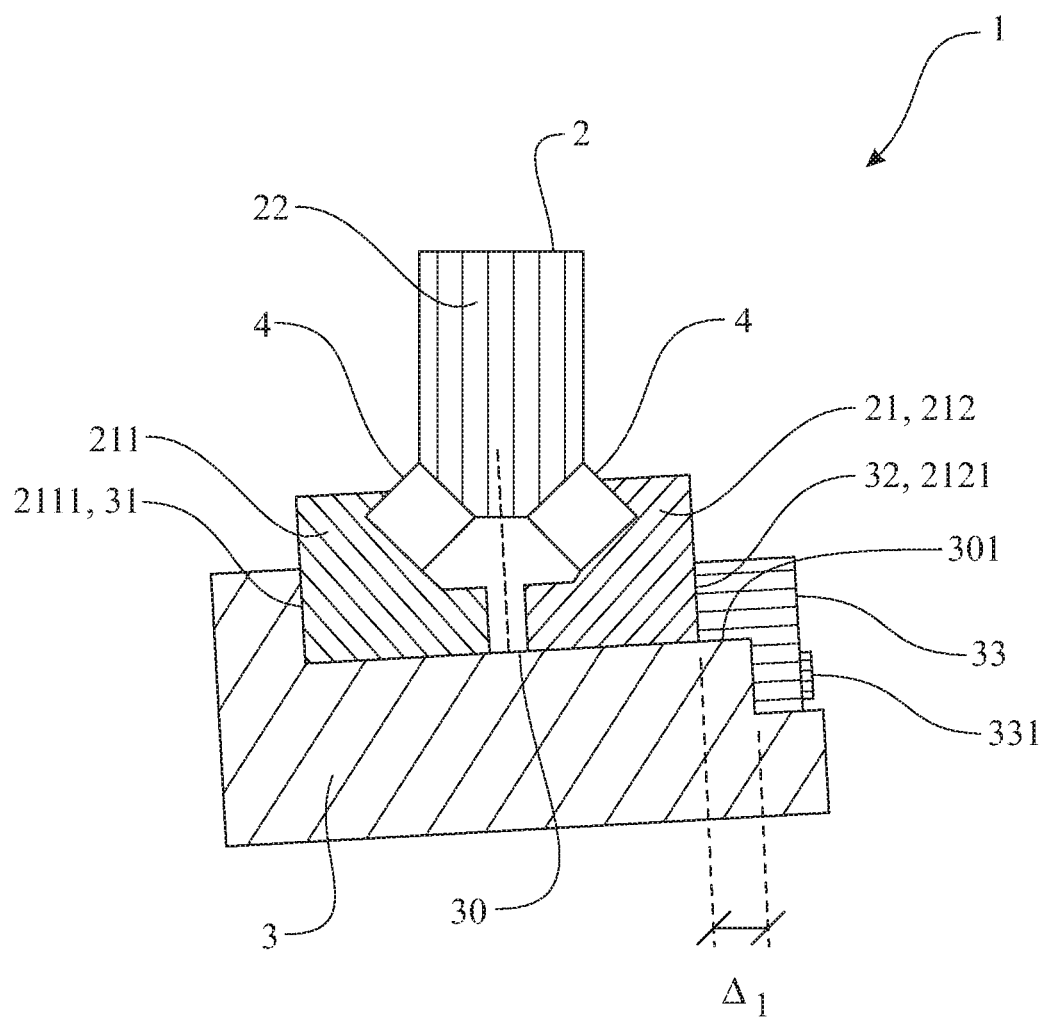
FIG. 1 shows a cross section of a bearing unit according to an embodiment of the first aspect of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION

In FIG. 1 a cross section of a large size bearing unit 1 according to an embodiment of the present invention can be seen. For rotating applications which are large in size and where there are high loads present, there is most likely a need for a bearing of a larger size, for example a bearing providing an outer diameter being larger than 0.5 meters.

The cross section is an axial cross section which coincides with the rotational axle A of the bearing unit 1. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. In this specific embodiment, the bearing unit is a large size double-row tapered roller bearing providing a back-to-back configuration. The first ring element 21 provides at least two separate ring elements, 211 and 212 respectively, which are located adjacently in a row along the rotational axle A. Furthermore, at least one ring-formed support element 3 is at least partly embedding the at least two separate ring elements, 211 and 212 respectively, and provides a seat surface 30 onto which the at least two separate ring elements are located, wherein the at least one ring-formed support element 3 further provides two axially opposite side surfaces, 31 and 32 respectively, extending radially outwardly from the seat surface 30 to thereby partly enclose the at least two separate ring elements, 211 and 212 respectively. One of the axially opposite side surfaces, i.e. 32, is located on a separate ring-formed element 33 of the at least one ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. The separate ring-formed element 33 of the ring-formed support element 3 is connected to the ring-formed support element 3 by a screw connection 331. Further, in this embodiment, the separate ring element 33 provides an L-shaped cross section, which may be beneficial e.g. for improving the connection and the positioning of the separate element 33 to the support element 3. As can be seen, the seat surface 30 provides an axial distance Δ1 that can be measured after the rolling bearing has been positioned onto the seat surface 30, with a predetermined axial pressure. After the distance Δ1 is known, the separate ring-formed element 33 can be provided, which in turn has a corresponding axial extension that is based on the distance Δ1 such that the predetermined axial pressure can be obtained when the separate element 33 is connected to the support element 3. Thereby the unit will attain a predetermined preload or clearance that can be customized for a specific application, such as a wind turbine main shaft arrangement. The L-shaped ring-element 33 is further positioned on a second seat surface 301 of the support element 3, which is located axially outside the seat surface 30 and further provides a smaller diameter than the first seat surface 30. With this design, the unit 1 will present a smooth outer geometry which may e.g. facilitate the mounting procedure and handling of the unit 1. Such an additional seat surface may be arranged for any of the embodiments disclosed herein of the unit. In one embodiment, also the screw connections 331 for the separate ring element 33 are located within the outer external geometry of the ring-formed support element 3 as seen in the axial cross section of the unit.

Figure 2:
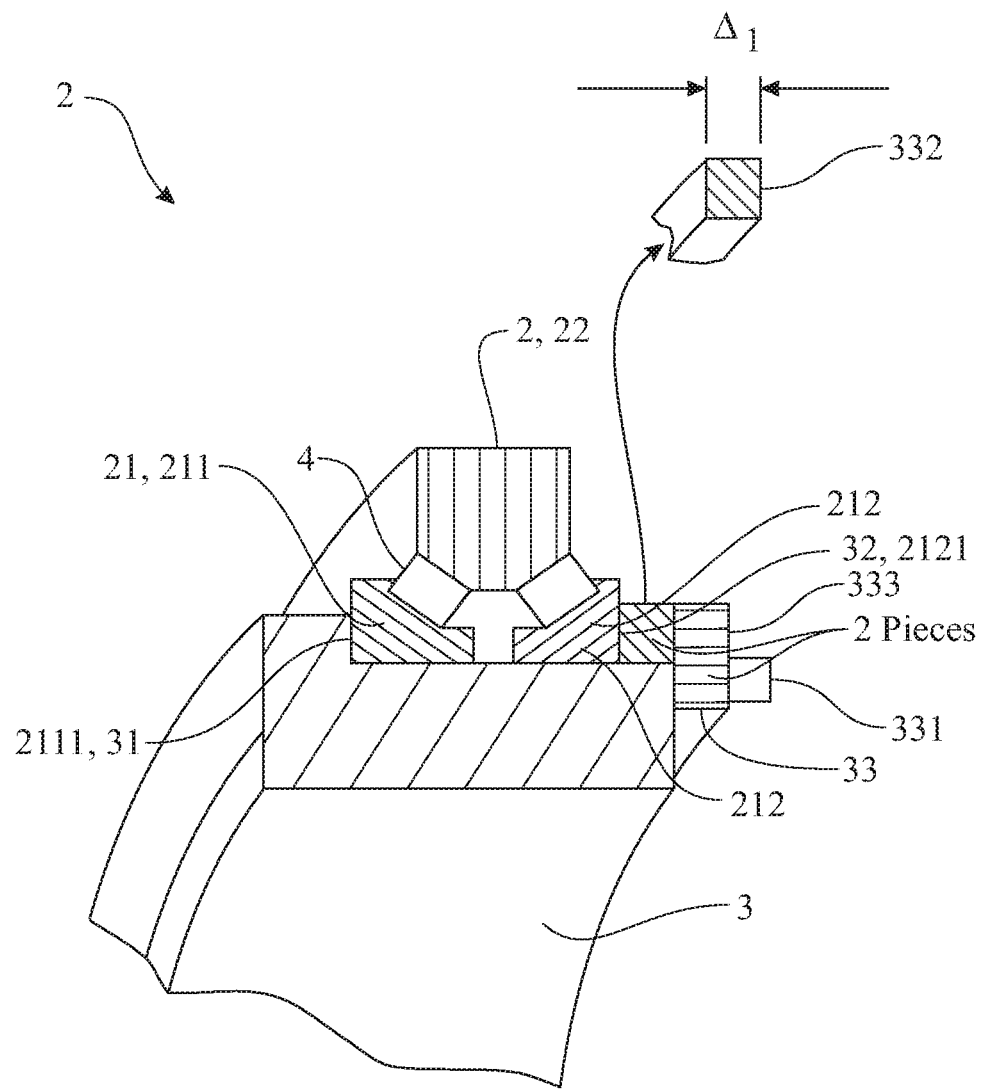
FIG. 2 shows a cross section of a bearing unit according to another embodiment of the first aspect of the present invention.

In FIG. 2, a cross section and partly a three dimensional view of another embodiment of the first aspect of the present invention can be seen. The cross section is an axial cross section which coincides with the rotational axle A of the large size bearing unit 1. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. Also in this specific embodiment, the bearing unit is a large size double-row tapered roller bearing providing a back-to-back configuration. The first ring element 21 provides at least two separate ring elements, 211 and 212 respectively, which are located adjacently in a row along the rotational axle A. Furthermore, at least one ring-formed support element 3 is at least partly embedding the at least two separate ring elements, 211 and 212 respectively, and provides a seat surface 30 onto which the at least two separate ring elements are located, wherein the at least one ring-formed support element 3 further provides two axially opposite surfaces, 31 and 32 respectively, extending radially outwardly from the seat surface 30 to thereby partly enclose the at least two separate ring elements, 211 and 212 respectively. One of the axially opposite side surfaces, i.e. 32, is located on a separate ring-formed element 33 of the at least one ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. In this embodiment there is a certain axial gap between the first and the second ring elements 211 and 212 on the seat surface 30. The separate ring-formed element 33 of the ring-formed support element 3 is connected to the ring-formed support element 3 by a screw connection 331. Further, in this embodiment, the separate ring element 33 is made of two separate ring elements, 332 and 333 respectively. As can be seen, the seat surface 30 provides an axial distance Δ1 that can be measured after the rolling bearing has been positioned onto the seat surface, with a predetermined axial pressure. In this embodiment, the ring element 332 is made with an essentially similar axial extension Δ1. Thereby the unit will attain a predetermined preload or clearance when the separate element 33 is properly mounted.

Figure 3:
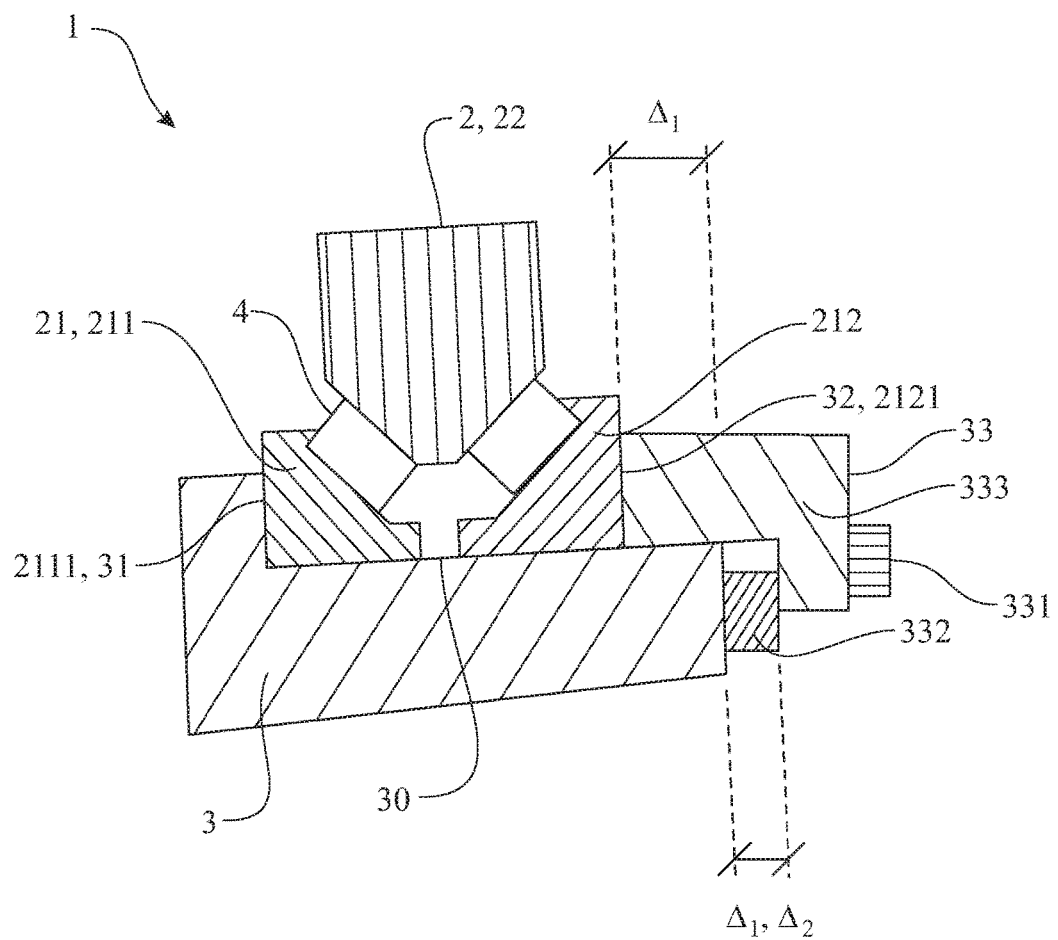
FIG. 3 shows a cross section of a bearing unit according to a third embodiment of the first aspect of the present invention.

In FIG. 3 another cross section of an embodiment of a large size bearing unit 1 according to the first aspect of the invention can be seen. The cross section is an axial cross section which coincides with the rotational axle A of the bearing unit 1. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. Also in this specific embodiment, the bearing unit is a large size double-row tapered roller bearing providing a back-to-back configuration. The first ring element 21 provides at least two separate ring elements, 211 and 212 respectively, which are located adjacently in a row along the rotational axle A. Furthermore, at least one ring-formed support element 3 is at least partly embedding the at least two separate ring elements, 211 and 212 respectively, and provides a seat surface 30 onto which the at least two separate ring elements are located, wherein the at least one ring-formed support element 3 further provides two axially opposite surfaces, 31 and 32 respectively, extending radially outwardly from the seat surface 30 to thereby partly enclose the at least two separate ring elements, 211 and 212 respectively. One of the axially opposite side surfaces, i.e. 32, is located on a separate ring-formed element 33 of the at least one ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. In this embodiment there is a certain axial gap between the first and the second ring elements 211 and 212 on the seat surface 30. The separate ring-formed element 33 of the ring-formed support element 3 is connected to the ring-formed support element 3 by a screw connection 331. Further, in this embodiment, the separate ring element 33 is made of two separate ring elements, 332 and 333 respectively. As can be seen, the seat surface 30 provides an axial distance Δ1 that can be measured after the rolling bearing has been positioned onto the seat surface, with a predetermined axial pressure. In this embodiment, the ring element 332 is made with an essentially similar axial extension as Δ1, i.e. Δ2 of the element 332 is essentially similar to Δ1. As can also be seen for this embodiment, the ring element 332 is located on an axial side surface of the support element 3, and the other part of the separate element 33, ie. the element 333, provides an L-shaped cross section that partly encloses the element 332. Thereby the unit will attain a predetermined preload or clearance when the separate element 33 is properly mounted.

Figure 4:
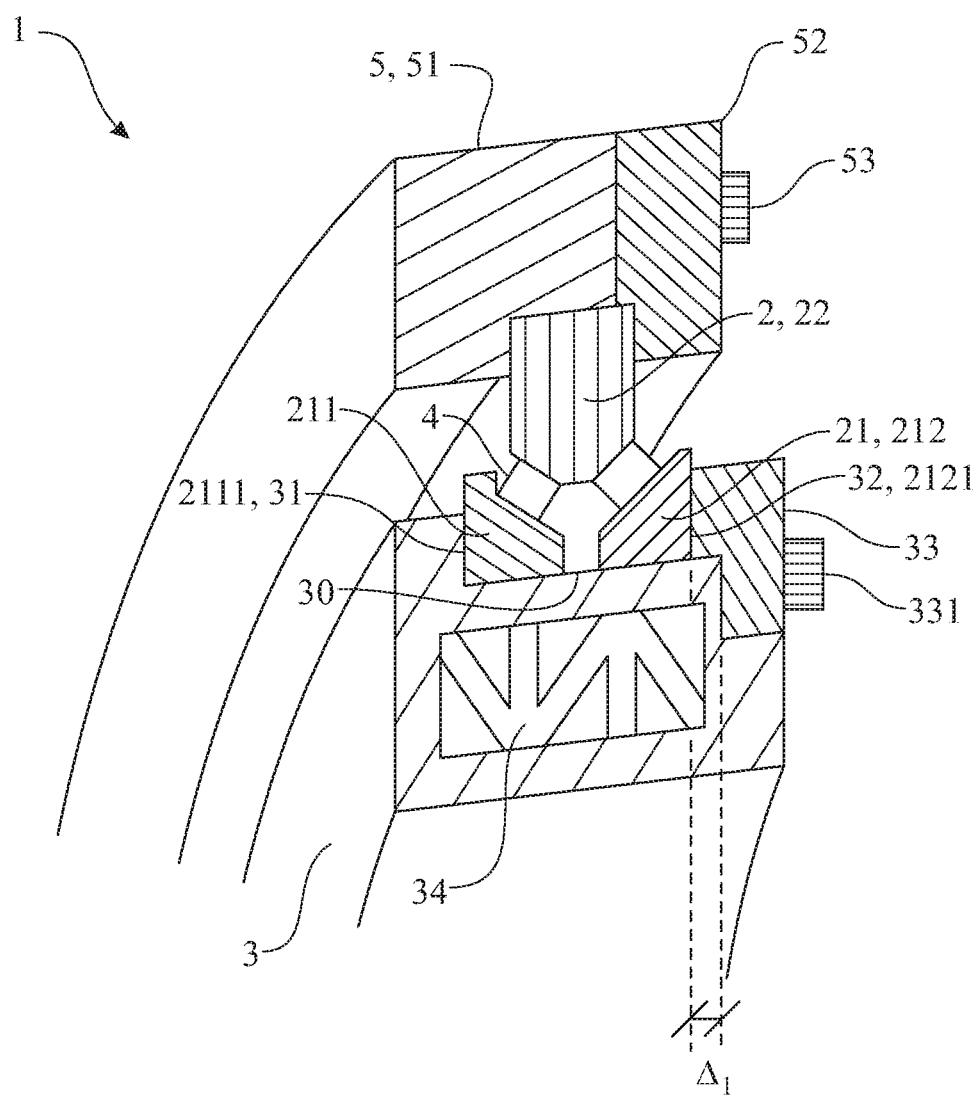
FIG. 4 shows a cross section of a bearing unit according to a fourth embodiment of the first aspect of the present invention.

In FIG. 4 another embodiment of a large size bearing unit 1 can be seen. The figure shows a cross section of such a bearing unit 1 and a three dimensional view. The cross section is an axial cross section. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. In this specific embodiment, the bearing unit 1 is a large size double-row tapered roller bearing providing a back-to-back configuration. The first ring element 21 provides at least two separate ring elements, 211 and 212 respectively, which are located adjacently in a row along the rotational axle A. Furthermore, at least one ring-formed support element 3 is at least partly embedding the at least two separate ring elements, 211 and 212 respectively, and provides a seat surface 30 onto which the at least two separate ring elements are located, wherein the at least one ring-formed support element 3 further provides two axially opposite surfaces, 31 and 32 respectively, extending radially outwardly from the seat surface 30 to thereby partly enclose the at least two separate ring elements, 211 and 212 respectively. One of the axially opposite side surfaces, i.e. 32, is located on a separate ring-formed element 33 of the at least one ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. The separate ring-formed element 33 of the ring-formed support element 3 is connected to the ring-formed support element 3 by a screw connection 331. Further, in this embodiment, the separate ring element 33 provides an L-shaped cross section, which may be beneficial e.g. for improving the connection and the positioning of the separate element 33 to the support element 3. As can be seen, the seat surface 30 provides an axial distance Δ1 that can be measured after the rolling bearing has been positioned onto the seat surface, with a predetermined axial pressure. After the distance Δ1 is known, the separate ring-formed element 33 can be mounted, which in turn has a corresponding axial extension that is based on the distance Δ1 such that the predetermined axial pressure can be obtained when the separate element 33 is connected to the support element 3. Thereby the unit will attain a predetermined preload or clearance that can be customized for a specific application, such as a wind turbine main shaft arrangement. In addition, the ring-formed support element 3 provides an inner open geometry that comprises a plurality of elongated structural elements 34 which are arranged as a truss and to accommodate a load. The configuration will lead to a stiff and light-weight design, and this can be especially advantageous for large size applications, where a weight reduction can be of significant importance. In addition, such a design may lead to that the bearing will be able to operate in its nominal geometry since the truss arrangement will accommodate external loads acting on the unit, and thereby possible deformations of the rolling bearing during operation will be reduced. As can further be seen in FIG. 4, it provides an additional ring-formed support element 5 which is partly embedding the second ring element 22 of the rolling bearing 2. The support element 5 is made of two separate rings, 51 and 52 respectively, that are connected by a screw connection 53. Of course, also other connection means can be used which would provide a similar effect as a screw connection. This design of the bearing unit 1 will lead to a unit that is easier to mount into its intended application, and which further already has a predefined bearing preload or clearance.

Figure 5:
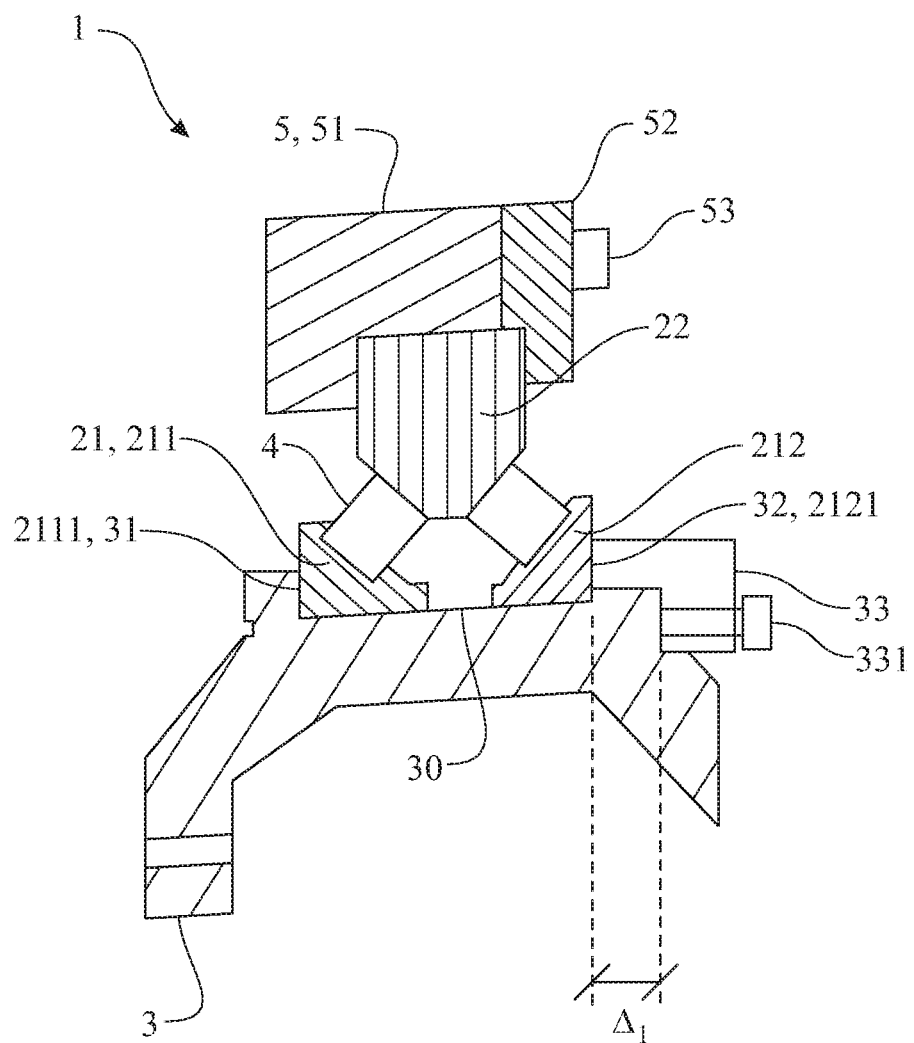
FIG. 5 shows a cross section of a bearing unit according to a fifth embodiment of the first aspect of the present invention.

In FIG. 5 another embodiment of a large size bearing unit 1 can be seen. The figure shows a cross section of such a bearing unit 1. The cross section is an axial cross section which coincides with the rotational axle A. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. In this specific embodiment, the bearing unit 1 is a large size double-row tapered roller bearing providing a back-to-back configuration. The first ring element 21 provides two separate ring elements, 211 and 212 respectively, which are located adjacently in a row along the rotational axle A. Furthermore, one ring-formed support element 3 is at least partly embedding the two separate ring elements, 211 and 212 respectively, and provides a seat surface 30 onto which the two separate ring elements are located, wherein the ring-formed support element 3 further provides two axially opposite surfaces, 31 and 32 respectively, extending radially outwardly from the seat surface 30 to thereby partly enclose the two separate ring elements, 211 and 212 respectively. One of the axially opposite side surfaces, i.e. 32, is located on a separate ring-formed element 33 of the ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. The separate ring-formed element 33 of the ring-formed support element 3 is connected to the ring-formed support element 3 by a screw connection 331. Further, in this embodiment, the separate ring element 33 provides an L-shaped cross section, which may be beneficial e.g. for improving the connection and the positioning of the separate element 33 to the support element 3. As can be seen, the seat surface 30 provides an axial distance Δ1 that can be measured after the rolling bearing has been positioned onto the seat surface, with a predetermined axial pressure. After the distance Δ1 is known, the separate ring-formed element 33 can be mounted, which in turn has a corresponding axial extension that is based on the distance Δ1 such that the predetermined axial pressure can be obtained when the separate element 33 is connected to the support element 3. Thereby the unit will attain a predetermined preload or clearance that can be customized for a specific application, such as a wind turbine main shaft arrangement. In addition, in this embodiment the ring-formed support element 3 is designed as a shaft, such as a wind turbine shaft or the like, in order to further customize the unit to a specific application. The shaft 3 may present connecting means, such as bores in which screws can be inserted to thereby connect the shaft 3 to a surrounding mechanical component. Such a component may e.g. be a hub of a wind turbine, but it could also be for other applications, such as a marine propeller shaft. As can further be seen in FIG. 5, it provides an additional ring-formed support element 5 which is partly embedding the second ring element 22 of the rolling bearing 2. The support element 5 is made of two separate rings, 51 and 52 respectively, that are connected by a screw connection 53. Of course, also other connection means can be used which would provide a similar effect as a screw connection. This design of the bearing unit 1 will lead to a unit 1 that is easier to mount into its intended application, and which further already has a predefined bearing preload or clearance.

Figure 6:
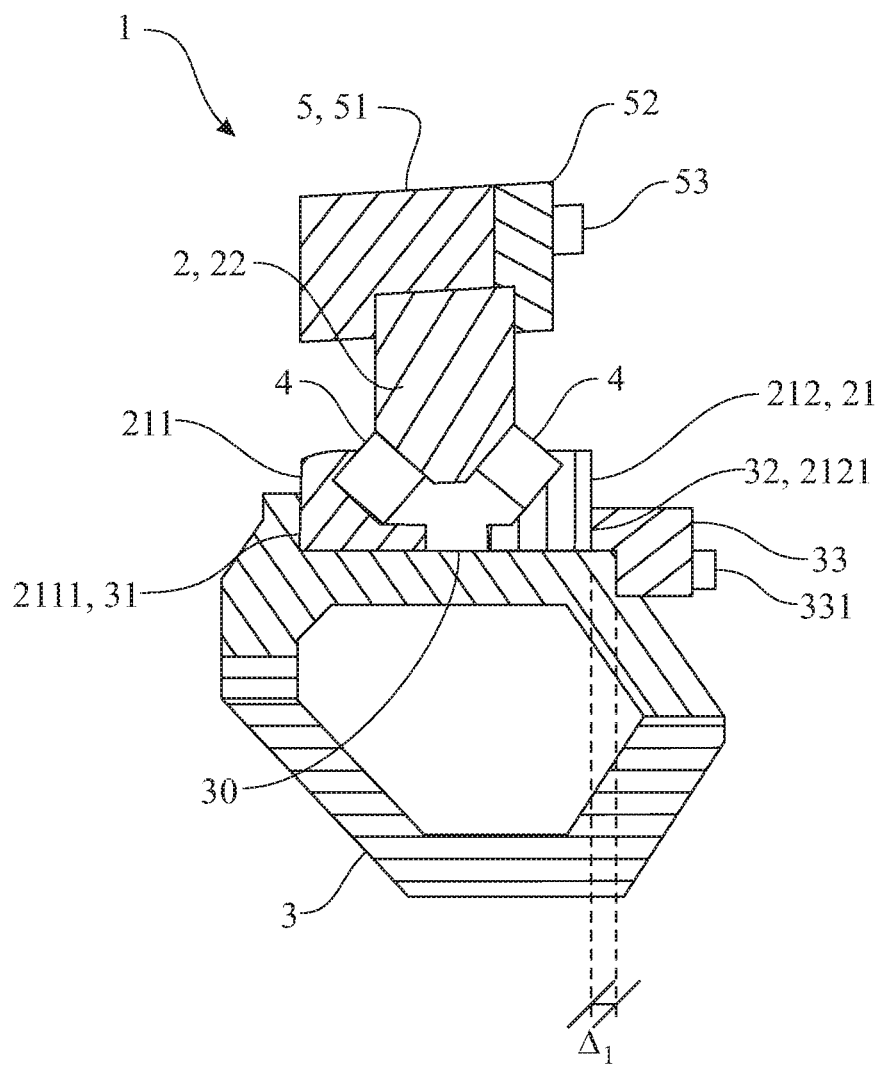
FIG. 6 shows a cross section of a bearing unit according to a sixth embodiment of the first aspect of the present invention.

In FIG. 6 another embodiment of a large size bearing unit 1 can be seen. The figure shows a cross section of such a bearing unit 1. The cross section is a cross section which coincides with the rotational axle A. The large size bearing unit 1 comprises a rolling bearing 2 providing a first ring element 21 and a second ring element 22 and a plurality of rolling elements 4 interposed radially in-between the first and the second ring elements, 21 and 22 respectively, such that the first and the second ring elements can rotate relative each other in relation to the rotational axle A. In this specific embodiment, the bearing unit 1 is a large size double-row tapered roller bearing providing a back-to-back configuration. The first ring element 21 provides two separate ring elements, 211 and 212 respectively, which are located adjacently in a row along the rotational axle A. Furthermore, one ring-formed support element 3 is at least partly embedding the two separate ring elements, 211 and 212 respectively, and provides a seat surface 30 onto which the two separate ring elements are located, wherein the ring-formed support element 3 further provides two axially opposite surfaces, 31 and 32 respectively, extending radially outwardly from the seat surface 30 to thereby partly enclose the two separate ring elements, 211 and 212 respectively. One of the axially opposite side surfaces, i.e. 32, is located on a separate ring-formed element 33 of the ring-formed support element 3, wherein the side surfaces, 31 and 32 respectively, are in pressurized contact with corresponding axially outer side surfaces, 2111 and 2121 respectively, of the at least two separate ring elements, 21 and 22 respectively, in order to press them together to thereby set a specific preload or clearance to the rolling bearing. The separate ring-formed element 33 of the ring-formed support element 3 is connected to the ring-formed support element 3 by a screw connection 331. Further, in this embodiment, the separate ring element 33 provides an L-shaped cross section, which may be beneficial e.g. for improving the connection and the positioning of the separate element 33 to the support element 3. As can be seen, the seat surface 30 provides an axial distance Δ1 that can be measured after the rolling bearing has been positioned onto the seat surface, with a predetermined axial pressure. After the distance Δ1 is known, the separate ring-formed element 33 can be mounted, which in turn has a corresponding axial extension that is based on the distance Δ1 such that the predetermined axial pressure can be obtained when the separate element 33 is connected to the support element 3. Thereby the unit will attain a predetermined preload or clearance that can be customized for a specific application, such as a wind turbine main shaft arrangement. In addition, in this embodiment the ring-formed support element 3 is designed as another type of shaft, such as another type of wind turbine shaft or the like, in order to further customize the unit to a specific application. The shaft 3 may present connecting means, such as bores in which screws can be inserted to thereby connect the shaft 3 to a surrounding mechanical component. Such a component may e.g. be a hub of a wind turbine, but it could also be for other applications, such as a marine propeller shaft. As can further be seen in FIG. 6, it provides an additional ring-formed support element 5 which is partly embedding the second ring element 22 of the rolling bearing 2. The support element 5 is made of two separate rings, 51 and 52 respectively, that are connected by a screw connection 53. Of course, also other connection means can be used which would provide a similar effect as a screw connection. This design of the bearing unit 1 will lead to a unit 1 that is easier to mount into its intended application, and which further already has a predefined bearing preload or clearance.

Figure 7:
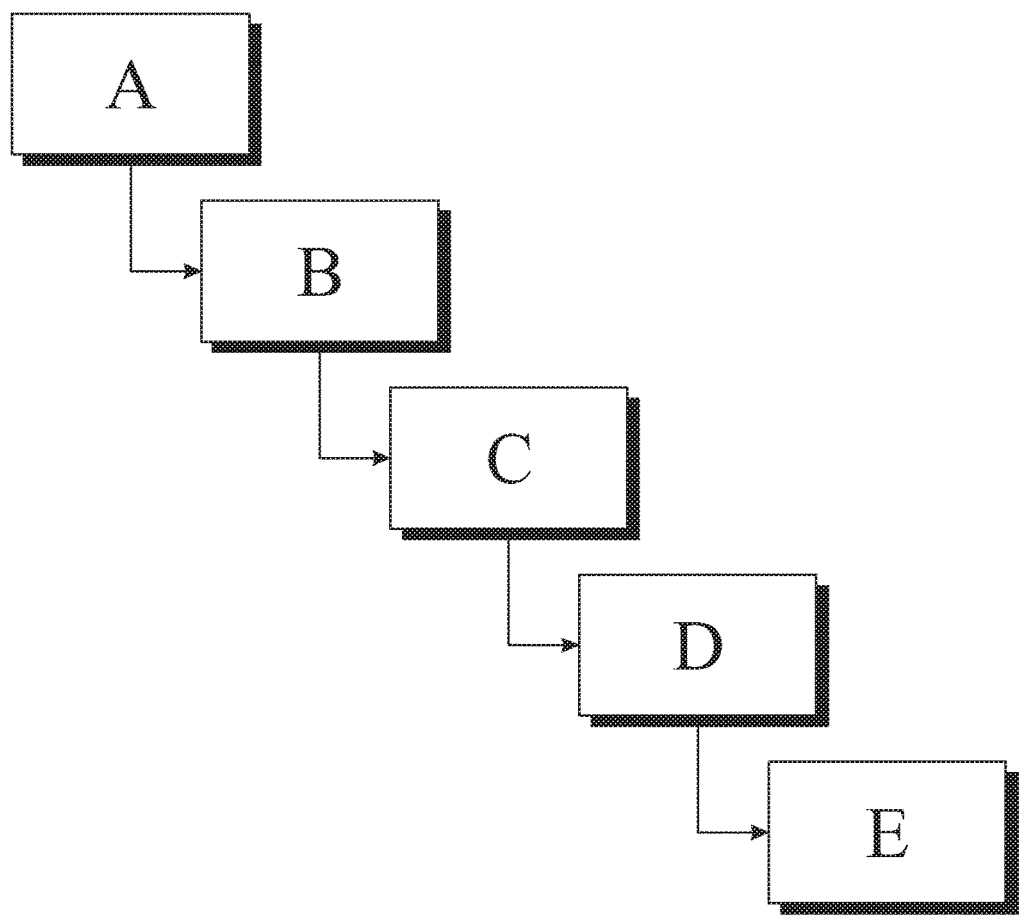
FIG. 7 shows a flow-chart of a method according to an embodiment of the second aspect of the present invention.

FIG. 7 shows a flow chart of a method according to an embodiment of the third aspect of the present invention. The method comprises the following steps:

A) mount the rolling bearing onto the seat surface of the ring-formed support element, B) press the at least two separate ring elements of the first ring element against one of the axially opposite side surfaces to obtain a specific axial pressure, C) subsequently measure an axial distance Δ1 of the ring-formed support element where the at least one separate ring-formed element of the ring-formed support element is meant to be positioned, D) provide the separate ring-formed element with a specific axial distance Δ2 based on the measured distance Δ1 such that the specific axial pressure can be obtained after the separate ring-formed element has been mounted onto the ring-formed support element, and E) mount the separate ring-formed element onto the ring-formed support element.

With the method a large bearing unit will be provided that will have a predefined bearing preload or clearance.

Figure 8:
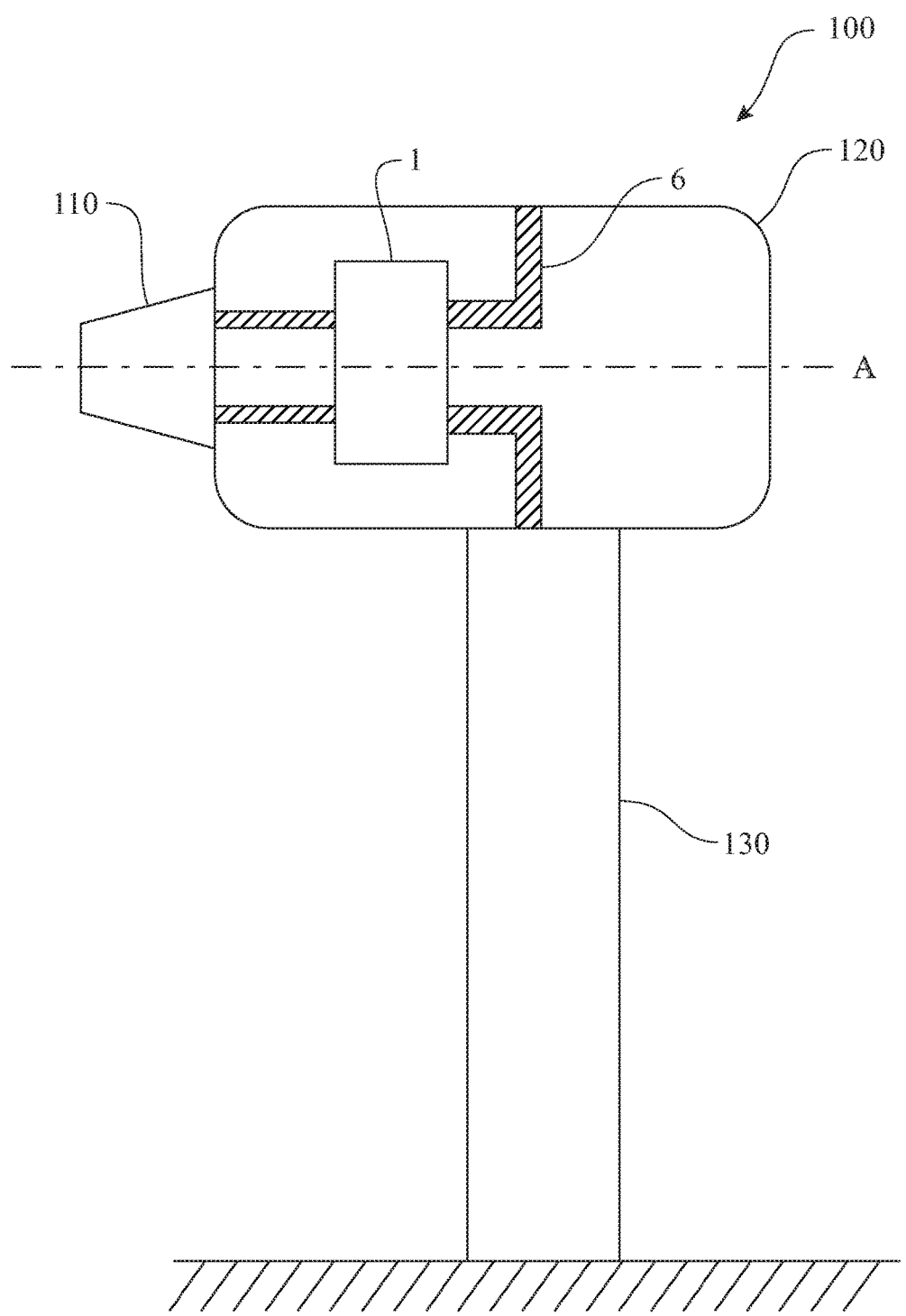
FIG. 8 shows a wind turbine and a wind turbine main shaft arrangement according to an embodiment of the third aspect of the present invention.

In FIG. 8, an embodiment of a wind turbine 100 and a wind turbine main shaft arrangement according to the second aspect of the invention can be seen. The wind turbine 100 comprises a large size bearing unit 1 according to any of the embodiments of the first aspect of the invention. In this embodiment, the bearing in the bearing unit 1 is a so called moment bearing that can accommodate radial, axial and moment loads. The bearing unit 1 is rotatably supporting a hub 110 onto which a number of propeller blades are connected (not shown). The bearing unit is supported and fixed to a frame 6 which in turn is connected to the wind turbine nacelle 120. The nacelle 120 is positioned onto a pillar or tower 130. The hub 110, the blades and the bearing unit 1 rotates around a rotational axle A, and consequently the energy created from the rotation is transferred into electricity by a generator (not shown). The wind turbine may be designed with a gear box, but it may also be designed without a gear box.

The invention is not limited to the embodiments described herein. It would be evident for the skilled person that other embodiments and modifications to the embodiments specified hereinabove are also possible within the scope of the claims. For example, the invention is not limited to only wind turbine applications. The skilled person will also recognize other possible applications in which the bearing unit could be advantageous, such as marine applications, mining applications etc.

REFERENCE SIGNS

1: Large size bearing unit
2: Rolling bearing
21: First ring element of rolling bearing
211: Separate ring element of first ring element of rolling bearing
2111: Axially outer side surface
2121: Axially outer side surface
212: Separate ring element of first ring element of rolling bearing
22: Second ring element of rolling bearing
3: Ring-formed support element
30: Seat surface
301: Second seat surface 31: Axial side surface of ring-formed support element
32: Axial side surface of ring-formed support element
33: Separate ring element of the ring-formed support element
331: Screw connection
332: Separate ring element
333 Separate ring element
4: Rolling elements
5: Additional ring-formed support element
51: Part of additional ring-formed support element
52: Part of additional ring-formed support element
53: Screw connection
100: Wind turbine
110: Hub
120: Nacelle
130: Tower

What is claimed is:

1. A large sized bearing unit, comprising,
a rolling bearing having a first ring element and a second ring element and a plurality of rolling elements interposed radially in-between the first and the second ring elements such that the first and the second ring elements can rotate relative each other in relation to a rotational axle, wherein
the first ring element provides at least two separate ring elements that are located adjacently in a row along the rotational axle,
at least one ring-formed support element that is at least partly embedding the at least two separate ring elements and includes a seat surface onto which the at least two separate ring elements are located, wherein
the at least one ring-formed support element further provides two axially opposite side surfaces extending radially from the seat surface to thereby partly enclose the at least two separate ring elements, wherein
at least one of the axially opposite side surfaces is located on a separate ring-formed element of the at least one ring-formed support element, the separate ring-formed element providing an L-shape as seen in an axial cross section that coincides with the rotational axis, and wherein
the side surfaces are in pressurized contact with corresponding axially outer side surfaces of the at least two separate ring elements in order to press them together to thereby set a specific preload or clearance to the rolling bearing.

2. The large size bearing unit according to claim 1, wherein the first ring element provides two separate ring elements.

3. The large size bearing unit according to claim 1, wherein the rolling elements of the rolling bearing are arranged in two rolling rows which are axially displaced in relation to the rotational axle.

4. The large size bearing unit according to claim 3, wherein each respective rolling row is located on one respective separate ring element of the first ring element.

5. The large size bearing unit according to claim 1, wherein the separate ring-formed element of the at least one ring-formed support element is made by at least two separate ring-formed elements.

6. The large size bearing unit according to claim 1, wherein the separate ring-formed element of the at least one ring-formed support element is fixedly connected to the ring-formed support element by at least one screw.

7. The large size bearing unit according to claim 1, wherein the bearing unit further comprises an additional ring-formed support element that is at least partly embedding the second ring element of the rolling bearing.

8. The large size bearing unit according to claim 1, wherein the rolling bearing is any one of a: moment bearing, a tapered roller bearing, a cylindrical roller bearing, or an angular contact double-row roller bearing providing curved-shaped raceways.

9. A wind turbine main shaft arrangement comprising:
the bearing unit according to claim 1 for rotatably supporting a hub onto which a number of propeller blades are connected.

10. A method to assemble the bearing unit according to claim 1, comprising the following steps:
a) mounting the rolling bearing onto the seat surface of the ring-formed support element,
b) pressing the at least two separate ring elements of the first ring element against one of the axially opposite side surfaces to obtain a specific axial pressure,
c) measuring an axial distance Δ1 of the ring-formed support element where the at least one separate ring-formed element of the ring-formed support element is configured to be positioned,
d) providing the separate ring-formed element with a specific axial distance Δ2 based on the measured distance Δ1 such that the specific axial pressure can be obtained after the separate ring-formed element has been mounted onto the ring-formed support element,
e) mounting the separate ring-formed element onto the ring-formed support element.

11. The method according to claim 10, wherein step c) further comprises:
measuring an axial distance Δ1 of an axially extending and radially peripheral surface of the ring-formed support element where the at least one separate ring-formed element of the ring-formed support element is configured to be positioned.

12. A large sized bearing unit, comprising,
a rolling bearing having a first ring element and a second ring element and a plurality of rolling elements interposed radially in-between the first and the second ring elements such that the first and the second ring elements can rotate relative each other in relation to a rotational axle, wherein
the first ring element provides at least two separate ring elements that are located adjacently in a row along the rotational axle,
at least one ring-formed support element that is at least partly embedding the at least two separate ring elements and includes a seat surface onto which the at least two separate ring elements are located, wherein
the at least one ring-formed support element further provides two axially opposite side surfaces extending radially from the seat surface to thereby partly enclose the at least two separate ring elements, wherein
at least one of the axially opposite side surfaces is located on a separate ring-formed element of the at least one ring-formed support element, wherein
the side surfaces are in pressurized contact with corresponding axially outer side surfaces of the at least two separate ring elements in order to press them together to thereby set a specific preload or clearance to the rolling bearing, and
wherein the at least one ring-formed support element provides an inner open geometry, and wherein the inner open geometry provides at least one structural elongated element that is configured for accommodating a load in the support element.

13. The large size bearing unit according to claim 12, wherein the at least one ring-formed support element provides a plurality of structural elongated elements in the inner open geometry, and wherein the structural elongated elements are arranged as a truss.

* * * * *